Figure 1:
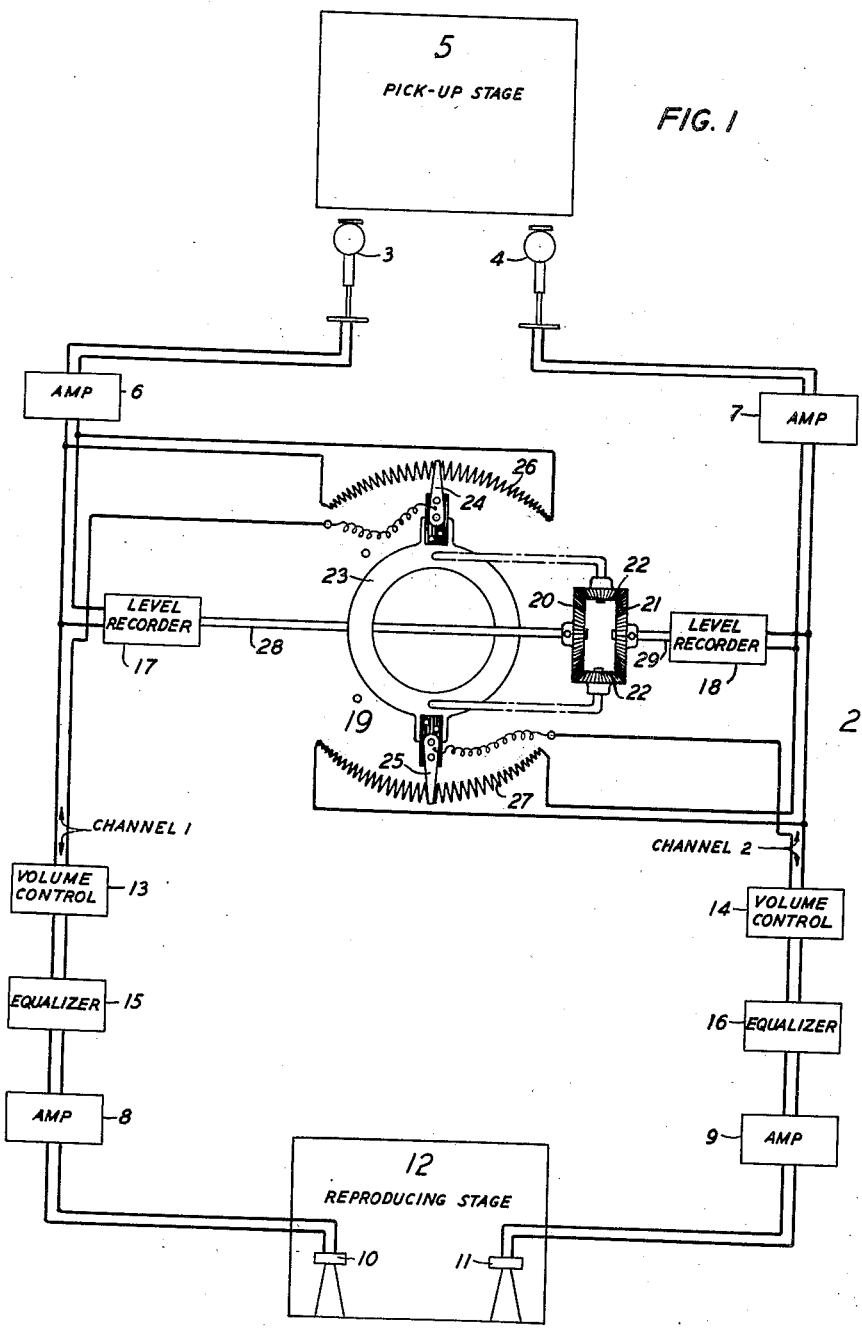

Aug. 16, 1938.  W. B. SNOW ET AL  2,126,929
SOUND REPRODUCING SYSTEM
Filed May 15, 1936   3 Sheets-Sheet 2

INVENTORS
W. B. SNOW
J. C. STEINBERG
BY
ATTORNEY

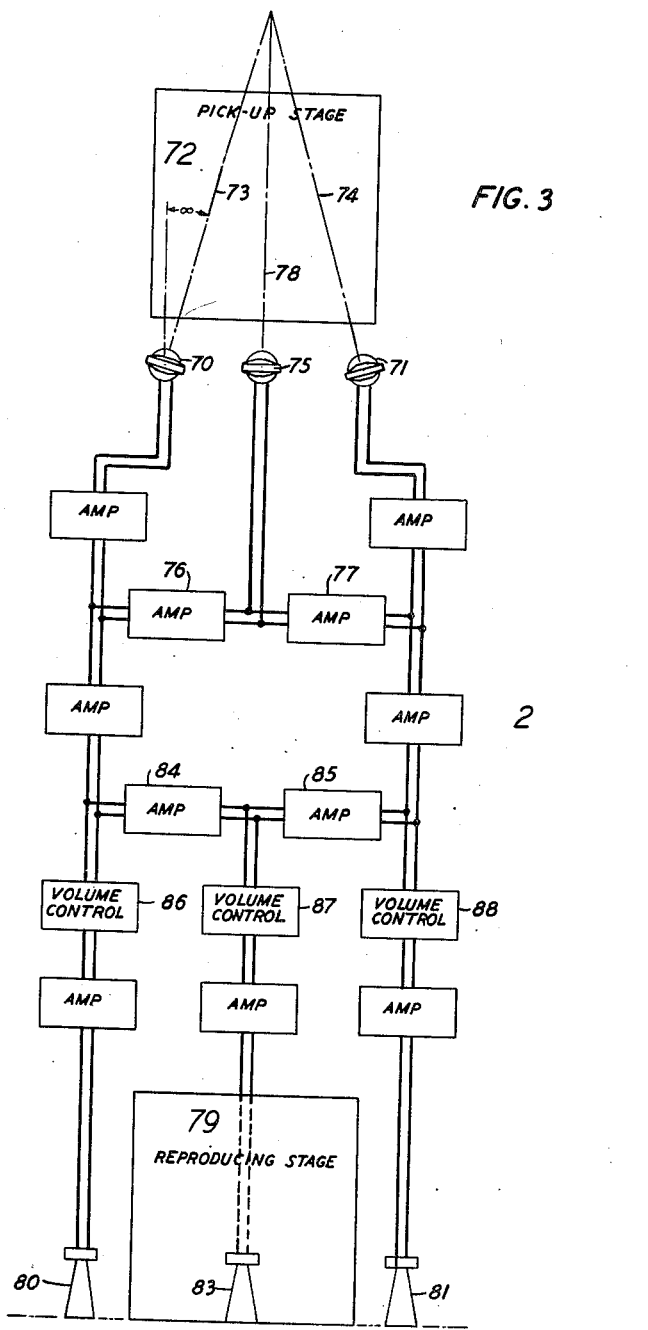

Patented Aug. 16, 1938

2,126,929

UNITED STATES PATENT OFFICE 2,126,929

SOUND REPRODUCING SYSTEM

William B. Snow, Maplewood, and John C. Steinberg, Lake Mohawk, Sparta, N. J., assignors to Bell Telephone Laboratories, Incorporated, New York, N. Y., a corporation of New York Application May 15, 1936, Serial No. 79,882

10 Claims. (Cl. 179—1)

This invention relates to the reproduction of sound with spacial distribution and the object of the invention is an improved system for producing this spacial or stereophonic effect.

It is well known in the art that when two microphones spaced in front of one stage are connected by separate lines to two loud-speakers spaced in front of another distant stage, the sounds reproduced by the loud-speakers appear to have a spacial or stereophonic distribution similar in general to that of the original sounds actuating the microphone. In a Patent 2,019,616 granted to J. P. Maxfield, November 5, 1935, there is disclosed an improved stereophonic system in which a third microphone disposed between the other two and connected through separate amplifiers to both transmission lines, is used to eliminate "bowing" and produce a more accurate stereophonic reproduction, particularly in the front central part of the stage.

With such systems sound sources, particularly when located toward the rear of the producing stage, are localized during reproduction in position somewhat nearer center stage than they should be and to correct for this effect the producing stage is usually flared considerably and the action spread over the increased stage width at the rear in order to produce a better distribution on the reproducing stage. The localization over the entire stage is then quite accurate for observer positions in front of center stage but as the observer moves to one side or the other (the real source remaining stationary) the virtual source shifts in the same direction at a faster rate so that the same sounds are localized in different parts of the stage by observers in different positions and the localization is often quite inaccurate for observer positions at the sides of the auditorium.

It is pointed out in the Maxfield patent that the lateral position between the loud-speakers in which a sound is localized on the reproducing stage is determined by the ratio of the "direct" sound energy emanating from the loud-speakers. From this it follows that when the pick-up stage is very "dead" the localization is determined by the relative loudness of the loud-speaker outputs. Applicants have found, however, that when the real source is moving laterally the virtual source, as observed from a given position, appears to lag somewhat behind its proper location on the reproducing stage.

According to one important feature of this invention the effective gain of each channel is varied as the sound source approaches and recedes from the several microphones in such a manner that more accurate lateral localization is obtained on the reproducing stage. The flare of the pick-up stage can therefore be reduced or dispensed with entirely and the movements of the actors or other sound sources can be more nearly in accordance with the actual effects to be produced. In general this requires that the changes in the energy level in each channel incident to the movements of the sound source, be accentuated, that is to say, the energy level must be arbitrarily reduced as the sound source recedes from the microphone and arbitrarily increased as the source moves toward the microphone.

These variations in the energy level can be effected in various ways according to the invention. In cases where sounds are produced in only one part of the stage at a time, volume controls may be used and operated manually in accordance with settings previously determined by experiment or they may be operated automatically by voice operated devices measuring the difference in sound output of the microphones.

When several sound sources in different parts of the stage are functioning simultaneously, a similar effect is produced by using microphones of directional sensitivity for the several pick-up positions. When such microphones are used in a system of the type proposed by Maxfield the center or bridging microphone is preferably even more directional than the others.

In two-channel systems the shifting of the virtual source with changes in the observer's position mentioned above is materially reduced by using on the reproducing stage a centrally located receiver bridged across both channels through separate amplifiers.

When the bridged receiver is used with a system of the Maxfield type, it is found that the reproducing stage is narrowed considerably or in other words the reproduced sound from a sound source passing from one microphone to the other does not appear to traverse the full distance between the receivers. This effect is utilized according to the invention to localize the reproduced sounds on the stage, by means of lateral receivers located in the wings. This system is particularly useful in cases where the bridged receiver can be concealed in the orchestra pit or within the stage setting since it leaves the remainder of the stage unobstructed and avoids the use of visible receivers which tend to destroy the stereophonic effect.

Figure 2:
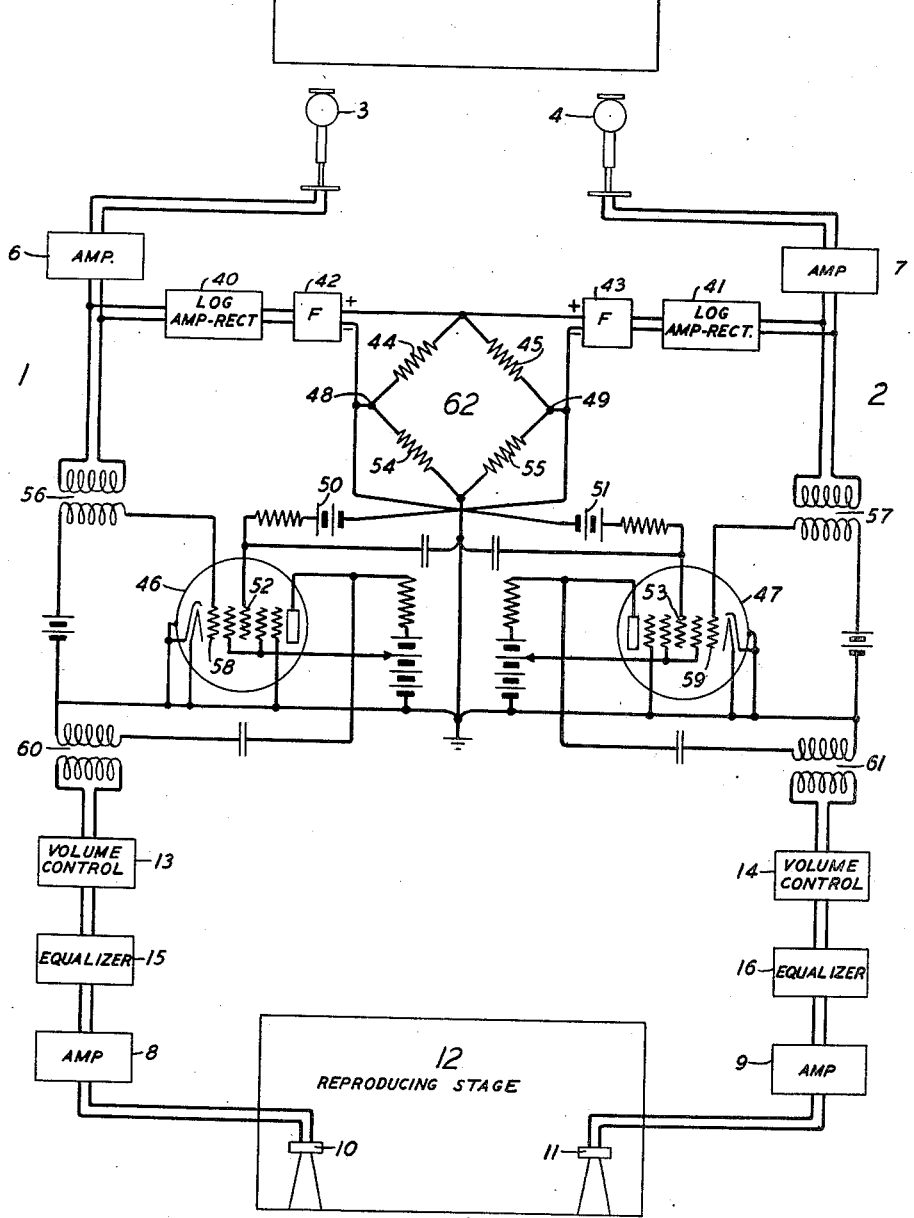

In the drawings Fig. 1 shows a mechanically operated system for varying the energy levels in the channels of a stereophonic sound reproducing system to increase the accuracy of localization of the virtual sound source;

Fig. 2 shows an electrically operated system which is an alternative to the system of Fig. 1; and Fig. 3 shows a stereophonic sound reproducing system using directional microphones to improve the localization.

Referring now to Fig. 1, the channels 1 and 2 include pick-up microphones 3 and 4 suitably disposed in front of the pick-up stage 5, amplifiers 6, 7 and 8, 9 and loud-speakers 10, 11 suitably located with respect to the reproducing stage 12 as in the conventional system of this type. Manually adjustable volume controls 13, 14 and equalizing filters 15, 16 are also provided so that any gain and quality differences between the channels may be eliminated before the system is to be used.

The devices 17 and 18 are high speed level recorders of the type described in detail by E. C. Wente, E. H. Bedell and K. D. Swartzell, Jr., in the Journal of the Acoustical Society, Vol. VI, pages 121–129 (January, 1935). For the purposes of this invention, however, the shaft which ordinarily drives a recording stylus in accordance with the input variations on a decibel scale, is used in this system to drive a gear in the differential gear mechanism 19. The bevel gears 20 and 21, driven by the devices 17 and 18 respectively, are interconnected by the planetary gears 22 on the cage 23. The cage carries potentiometer arms 24 and 25 mounted in sliding contact with the potentiometers 26 and 27 in the channels 1 and 2 respectively.

Since the shafts of the modified recorders 17 and 18 each move in accordance with the changes in decibels in the energy level of the associated channel, the algebraic sum of the motions of the two shafts will be proportional to the difference in decibels between the input levels to the two recorders and will be independent of the absolute values of these levels.

The gears 20 and 21 are mounted on the shafts 28 and 29 of the recorders so that when no signal excites the microphones the potentiometer arms 24 and 25 will be in the positions shown in Fig. 2, putting equal losses in the two channels. When sound waves of equal intensities actuate the two microphones simultaneously as in the case of a sound source equidistant from the microphones, the gears 20 and 21 will be rotated through equal angles and with the internal connections of one recorder reversed these motions will be in opposite directions so that the gears 22 merely rotate on their axes and the cage 23 does not move. If the output of microphone 4 becomes relatively greater than the output of microphone 3, as in the case of the sound source moving away from the latter and toward the former microphone, the gear 21 rotates farther in the same direction as before and the gear 20 now moves in the same direction as gear 21 (which is in the opposite direction to its former movement). Under this condition the gears 22 cannot rotate on their axes and the cage 23 follows the motion of the gears 20 and 21. Assume that for greater input to microphone 4, the gears 20 and 21 both rotate clockwise as viewed from channel 1 so that the cage is driven in the clockwise direction as viewed in Fig. 1. (It should be noted that for the sake of clarity of illustration the cage 23 has been shown as rotated through 90 degrees on its vertical axis in a clockwise direction from its proper position in which the plane of the cage is normal to the axis of the shaft 28.) Then, for the circuit shown, the potentiometer arms 24 and 25 respectively will increase the level in channel 2 and decrease the level in channel 1, thereby increasing the difference in level produced by the motion of the sound source.

Similarly, if the sound source moves away from microphone 4 and toward microphone 3, the gears 20 and 21 and the cage 23 will all move contra-clockwise, thereby decreasing the level in channel 2 and increasing the level in channel 1, thereby again increasing the difference in level produced by the motion of the sound source. The windings of the potentiometers 26 and 27 are preferably tapered as shown in Fig. 1 in such a way as to produce a larger change in level per degree of rotation near their normal, middle settings than near either extreme position of the arms. This produces a relatively large accentuating effect for small input ratios and thereby improves the localization where improvement is needed most, namely, at center stage and the rear of the stage where a given displacement of the sound source has least effect on the input ratios.

While the time properties of the mechanism required will vary somewhat with the type of sound being picked up, a relatively sluggish action of both electrical and mechanical parts is, in general, preferred so that the accentuating effect is introduced only for appreciable changes in the position of the sound source.

The system of Fig. 2 produces substantially the same effects as the system just described without the use of moving parts. Since this system is similar to the system of Fig. 1 except for the circuits for accentuating the volume level differences, the microphones, loud-speakers and other apparatus common to the two systems have been designated as in Fig. 1.

The outputs of the microphones 3 and 4 are fed through the amplifiers 6 and 7 respectively to the transformers 56 and 57. The secondaries of these transformers are connected to the signal grids 58 and 59 of the tubes 46 and 47 and outputs of these tubes are fed through transformers 60 and 61 to the loud-speakers 10 and 11 over transmission channels similar to those in the system previously described.

Across the output of the amplifiers 6 and 7 are connected amplifier-rectifiers 40 and 41 of the type described by F. V. Hunt in the Review of Scientific Instruments for December 1933 at page 672. The output of these rectifiers varies logarithmically with the input and is therefore proportional to the changes in the level of the associated channel in decibels. The filters 42 and 43 eliminate any alternating components of sound frequency from the rectifier outputs and the varying direct output potentials are impressed on the resistors 44 and 45 of the bridge circuit 62 in opposed relationship as indicated.

The tube 46 in channel 1 and tube 47 in channel 2 vary the volume levels in the two channels in accordance with the ratio of the outputs of the two rectifiers 40 and 41. These volume control stages considered separately are each similar in general to the expander for phonograph reproduction described in Electronics for November 1935, page 14 (428).

In this system, if the sound source produces equal levels in the two channels, the potentials across the resistors 44 and 45 are equal and no potential difference exists between the points 48 and 49. Under this condition the gains of the tubes 46 and 47 are equal and at the normal level determined by the biasing batteries 50 and 51 in leads to the volume control grids 52 and 53.

If the sound source moves toward the microphone 4 so that the level in channel 2 becomes greater than that in channel 1, the voltage across the resistor 45 becomes greater than the voltage across the resistor 44, current flows from point 48 to point 49 through the resistors 54 and 55 and applies a positive bias increment to the grid 53 of the tube 47 in channel 2 and a negative bias increment to the grid 52 of the tube 46 in channel 1. This increases the gain of tube 47 and decreases the gain of tube 46, thereby accentuating the original difference in level at the microphones and increasing the stereophonic effect as in the system previously described.

Similarly if the level in channel 1 becomes greater than that in channel 2 current flows from point 49 to point 48 through the resistors 55 and 54 and increases the gain of tube 46 and decreases the gain of tube 47 which again accentuates the original difference in the channel levels.

Since the voltages across the resistors 44 and 45 are proportional to the logarithms of the microphone outputs and these voltages are in opposed relationship in the bridge circuit 62, the bias voltage increments applied to the tubes 46 and 47 will be proportional to the difference of these logarithms or to the ratio of the microphone outputs. A given difference in decibels between the levels in the two microphone outputs will therefore produce the same accentuating effect within the range of the rectifiers independently of the absolute volume level.

The systems of Figs. 1 and 2 are of value principally for systems in which only one sound source is changing its position with respect to the microphones at any one time. In cases where two or more sources may be moving simultaneously in different directions the localization is improved by a system of the type shown in Fig. 3.

It has been found that in a stereophonic system the apparent position of a virtual sound source on the reproducing stage may be shifted by changing the relative quality of the sound reproduced by the various channels. In general a sound source at the center of the pick-up stage localizes on the reproducing stage nearer the loud-speaker emitting the greater amount of high frequency energy.

This effect is utilized in the system of Fig. 3 to correct for the lag in the apparent motion of a virtual source representing a real source moving from center stage toward either microphone, by increasing the high frequency energy in the output of the microphone toward which the real source is moving and decreasing the high frequency energy in the output of the microphone from which the real source is receding.

It is well known that some types of microphones are directive particularly at high frequencies or in other words that their efficiency of conversion of acoustic energy to electrical energy varies with the angle from which the sound waves approach it. One such microphone of the moving coil type is described by W. C. Jones and L. W. Giles in the Journal of the Society of Motion Picture Engineers for December, 1931. It is well known that the directivity of such a device can be increased when desired in various ways such as by using a larger diaphragm, suitable baffles or a short horn leading to the diaphragm. The parabolic reflector type microphone is even more directive than the one referred to above and its directivity can be modified to suit the requirements of a particular case by varying the size of the parabolic reflector to control the frequency at which directivity begins and by detuning the device as suggested in Fig. 8 of the article "Microphone technique in radio broadcasting" by O. B. Hanson in the Journal of the Acoustical Society for July 1931.

The microphones 70 and 71 in Fig. 3 may be of one of the directive types discussed above and are disposed in front of the pick-up stage 72 with their axes of greatest sensitivity converging toward the center of the stage as indicated by the lines 73 and 74. The angle at which these axes converge is necessarily a compromise. For best rear line localization in a straight two-channel system the angle α should be small and for best front line localization the angle should be of the order of 22 degrees. If a three-channel system or a phantom third channel of the type shown in the drawings is used to improve localization at front center stage it will usually be advantageous to reduce the angle to 10 degrees or 15 degrees to improve the localization at the rear of the stage. The phantom third channel comprises a centrally disposed microphone 75 connected to both of the channels through separate unilaterally conducting devices such as amplifiers 76 and 77. The advantages of this type of system and the manner in which it approximates the effect of a full third channel are clearly explained in the Maxfield patent referred to above.

When, for example, a straight two-channel system is used with a pick-up stage about twelve feet square the microphones are preferably disposed about nine feet apart and at about five feet from the stage. When a central microphone with either a phantom or independent third channel is used better results are obtained by locating all the microphones nearer the stage and by spacing the lateral microphones somewhat farther apart. The main function of the central microphone is to improve front center localization. This microphone is, therefore, preferably even more directional than the lateral microphones so that its effect rapidly decreases as the sound source moves toward the side of the stage.

Assume a sound source on the stage 72 of Fig. 3 on the center line 78. For any position on this line the microphone 75 is of maximum sensitivity and microphones 70 and 71 are of somewhat reduced but equal sensitivity so that the source localizes on the center line of the reproducing stage 79. If the source moves to the left of center toward channel 1, the sound waves strike microphone 70 at a more efficient angle and strike the microphone 71 at a less efficient angle thereby both increasing the output of loud-speaker 80 and decreasing the output of loud-speaker 81 to a greater extent than produced by the change in the lengths of the sound paths. Conversely, a displacement of the sound source to the right of center increases the efficiency of microphone 71 and decreases the efficiency of microphone 70 to again accentuate the loudness difference produced by the change in the lengths of the air paths.

It will be seen from the drawings that as the source moves laterally in any part of the central portion of the stage the efficiency of the microphone toward which the source is approaching increases and the efficiency of the microphone from which it is receding decreases so that the tendency of the virtual source to lag behind its proper position is compensated.

The sensitivity of the bridged central microphone 75, when used, is symmetrical with respect to the center line of the stage and the output of this microphone is equally divided between the channels so that the changes in efficiency of this microphone incident to the changing location of the sound source do not affect the accentuating effect of the directional characteristics of the lateral microphones.

The lateral position in which the virtual source is localized depends upon the ratio of the levels of the direct sound energy in the two channels as explained by Maxfield and directional microphones are advantageous in that they reduce the pick-up of reverberant energy but this is not the primary advantage in using such microphones in a system of this type. The pick-up stage is preferably heavily damped to reduce reverberation and even with a very "dead" pick-up stage the improved accuracy of localization obtained by using directional microphones is very marked.

The microphones are, of course, relatively non-directional for low frequencies and the directivity increases with frequency. For the purposes of this invention, however, high frequency directivity is most important since the shadow effect of the head of an observer upon the observed difference of loudness at his two ears for variations in the angular location of the virtual source is greatest at high frequencies. It will be understood that the precise directivity characteristic to be used will vary with many other factors and that best results can be obtained only by experimentation based on the local condition in each case.

In the system of Fig. 3, a centrally disposed loud-speaker 83 is bridged across the two channels by amplifiers 84 and 85 in a manner similar to the connections of microphone 75 and the loud-speaker circuits are provided with separate volume controls 86, 87 and 88 so that the output of the loud-speaker may be adjusted with respect to the other loud-speakers to give the best results for the particular case. The double bridge arrangement materially reduces the width of the virtual stage and this effect is utilized according to the invention by spacing the lateral loud-speakers 80 and 81 farther apart as shown in the drawings so that the sound is localized over the desired stage width with the lateral loud-speakers off-stage where they may be concealed from the audience. Since as explained above, the higher frequencies are most effective in localizing the sound source, the loud-speaker 83 may be of a type which is responsive only to high frequencies. It may therefore be much smaller than the lateral loud-speakers and hence easier to conceal and less objectionable in cases where it cannot be concealed.

While the various features of the invention have been described with reference to systems for the direct reproduction of sounds in stereophonic relation, it will be understood that the invention is equally applicable to systems in which stereophonic records are made for subsequent reproduction. When such records are to be made in the transmission channels the loud-speakers are replaced by recorders and in the claims the expression "receiving device" is intended to mean either a loud-speaker or any form of recorder. In the reproducing system the loud-speakers may be actuated either directly by the pick-up energy or indirectly by records made from the microphone currents. It will also be apparent that if desired the records may be made in the ordinary manner and the accentuating effects introduced during reproduction of the records by means of systems such as those shown in Fig. 1 or 3.

What is claimed is:

1. In a stereophonic sound reproducing system, two spaced sound pick-up devices, two receiving devices, lines connecting the devices to the receivers, a volume control for each of the lines, and means for producing a force varying with the difference in the outputs of the pick-up devices and means responsive to the force operating the control to accentuate said difference.

2. A system according to claim 1 in which the means for operating the volume controls comprises means associated with each pick-up device having a member moving in accordance with the logarithm of the variation in the output of the device, and differential gearing associated with the member connected to the volume controls.

3. In a stereophonic system two transmission lines carrying currents representing sound waves from the same real source at different pick-up positions, two spaced loud-speakers connected to the lines and reproducing the sound from the source in spacial distribution and means for compensating for the lag in the apparent motion of the reproduced source of sound as compared with the motion of the real source between the pick-up positions comprising means for accentuating the normal amplitude differences in the currents in the two lines incident to motion of the source of the sound waves with respect to the pick-up positions.

4. In a stereophonic sound translating system, a sound pick-up system comprising a pair of spaced sound pick-up devices, an amplifier for each device and means for measuring the outputs of the devices, and means responsive to the difference in the outputs for varying the effective gain of the amplifiers.

5. In a stereophonic sound reproducing system, two spaced pick-up microphones, two spaced loud-speakers, lines connecting the microphones to the loud-speakers, a logarithmic rectifier connected to each line, a circuit connecting the outputs of the rectifiers in opposed relationship, an amplifier in each line, and means for increasing the gain of one of the amplifiers and decreasing the gain of the other in accordance with the difference between the rectifier output potentials.

6. In a stereophonic sound translating system, a pair of microphones laterally spaced in front of a sound producing area, receiving devices, transmission lines connecting the microphones to the receiving devices, a centrally located sound pick-up device and unilaterally conducting means for connecting the device to each of the lines, the lateral microphones having a directional pick-up characteristic and being disposed with their axes of greatest sensitivity converging toward the back of said area and the device having a highly directional pick-up characteristic and being disposed with its axis of greatest sensitivity substantially on the center line of said area.

7. In a stereophonic reproducing system, a pair of sound pick-up devices spaced in front of a sound producing stage, a transmission line for each of the devices, and means for reproducing the output of the devices in stereophonic relation on a reproducing stage comprising two receivers located offstage on opposite sides of the stage and connected to the lines, a third receiver disposed between the other two and a unilaterally conducting circuit connecting said receiver to each of the lines.

8. A system according to claim 7 in which the third receiver is smaller than the other receivers and is responsive only to the higher frequencies.

9. In the method of reproducing sounds in stereophonic relation comprising generating currents representing the sounds as picked up at different pick-up positions, separately transmitting the currents and retranslating them into sounds at spaced reproducing points, the step of improving the accuracy of localization of the reproduced sound source which comprises accentuating, by the amount necessary to correct for the lag in the apparent motion of the reproduced source with respect to the actual motion of the sound source, the changes in the relative energy levels of the transmitting channels produced by the movements of the source with respect to the pick-up means.

10. A stereophonic sound translating system comprising sound pick-ups spaced before a sound producing area, separate transmission lines and spaced receiving devices therefor, in which the pick-ups comprise directional microphones with their axes of maximum sensitivity converging toward the back of the area to accentuate the normal differences in the outputs of the microphones incident to motion of a sound source across the area.

WILLIAM B. SNOW.
JOHN C. STEINBERG.